United States Patent
Ishimaru et al.

(10) Patent No.: US 11,518,595 B2
(45) Date of Patent: Dec. 6, 2022

(54) LAMINATE BODY AND PACKAGING BAG USING THE SAME

(71) Applicant: TOYOBO CO., LTD., Osaka (JP)

(72) Inventors: Shintaro Ishimaru, Tsuruga (JP); Masayuki Haruta, Tsuruga (JP)

(73) Assignee: TOYOBO CO., LTD., Osaka (JP)

(*) Notice: Subject to any disclaimer, the term of this patent is extended or adjusted under 35 U.S.C. 154(b) by 111 days.

(21) Appl. No.: 16/982,975

(22) PCT Filed: Mar. 1, 2019

(86) PCT No.: PCT/JP2019/008023
§ 371 (c)(1),
(2) Date: Sep. 21, 2020

(87) PCT Pub. No.: WO2019/187970
PCT Pub. Date: Oct. 3, 2019

(65) Prior Publication Data
US 2021/0016945 A1  Jan. 21, 2021

(30) Foreign Application Priority Data
Mar. 27, 2018 (JP) .............................. JP2018-059620

(51) Int. Cl.
*B65D 65/40* (2006.01)
*B32B 9/00* (2006.01)
(Continued)

(52) U.S. Cl.
CPC .............. *B65D 65/40* (2013.01); *B32B 9/005* (2013.01); *B32B 9/045* (2013.01); *B32B 15/09* (2013.01);
(Continued)

(58) Field of Classification Search
CPC ........ B65D 65/40; B65D 31/02; B32B 9/045; B32B 15/09; B32B 15/20; B32B 15/08;
(Continued)

(56) References Cited

U.S. PATENT DOCUMENTS

2016/0108171 A1    4/2016   Haruta et al.

FOREIGN PATENT DOCUMENTS

| JP | H07-132946 A | 5/1995 |
|----|--------------|--------|
| JP | 2004-042488 A | 2/2004 |

(Continued)

OTHER PUBLICATIONS

Machine Translation of JP 2017165060 (Year: 2017).*
(Continued)

*Primary Examiner* — James C Yager
(74) *Attorney, Agent, or Firm* — Leydig, Voit & Mayer, Ltd.

(57) ABSTRACT

A laminated body having at least two or more different layers, wherein the laminate body is characterized by satisfying the following requirements (1) to (5): (1) the laminate body has a heat-sealing layer as at least one of the outermost layers, wherein the heat-sealing layer includes a polyester based component containing ethylene terephthalate as a main constituent component, and a sealing strength of 8 N/15 mm to 30 N/15 mm; (2) at least one layer other than the heat-sealing layer is an inorganic thin film layer; (3) a water vapor permeation rate of 0.1 $g/m^2 \cdot d$ to 6 $g/m^2 \cdot d$; (4) an oxygen permeation rate of 5 $ml/m^2 \cdot d \cdot MPa$ to 30 $ml/m^2 \cdot d \cdot MPa$; and (5) a heat shrinkage rate of −5% to 5%.

16 Claims, 1 Drawing Sheet

(51) Int. Cl.
- *B32B 9/04* (2006.01)
- *B32B 15/09* (2006.01)
- *B32B 15/20* (2006.01)
- *B65D 30/08* (2006.01)
- *B32B 15/08* (2006.01)
- *B32B 27/36* (2006.01)

(52) U.S. Cl.
CPC .............. *B32B 15/20* (2013.01); *B65D 31/02* (2013.01); *B32B 15/08* (2013.01); *B32B 27/36* (2013.01); *B32B 2307/31* (2013.01); *B32B 2367/00* (2013.01); *B32B 2439/46* (2013.01); *Y10T 428/1328* (2015.01); *Y10T 428/1338* (2015.01); *Y10T 428/1352* (2015.01); *Y10T 428/1355* (2015.01); *Y10T 428/1359* (2015.01)

(58) Field of Classification Search
CPC . B32B 27/36; B32B 2307/31; B32B 2367/00; B32B 2439/46; B32B 2255/26; B32B 2307/732; B32B 27/34; B32B 2250/02; B32B 2250/03; B32B 7/02; B32B 7/035; B32B 27/08; B32B 27/20; B32B 2250/24; B32B 27/40; B32B 2255/20; B32B 2255/205; B32B 2255/28; B32B 2264/0235; B32B 2264/025; B32B 2264/102; B32B 2307/21; B32B 2307/306; B32B 2307/308; B32B 27/32; B32B 2264/0214; B32B 2264/104; B32B 2270/00; B32B 2307/402; B32B 2307/412; B32B 2307/516; B32B 2307/518; B32B 2307/546; B32B 2307/71; B32B 2307/724; B32B 2307/734; B32B 2307/746; B32B 2307/75; B32B 3/04; B32B 2439/70; B32B 2439/80; B32B 2553/00; B32B 7/12; B32B 27/16; B32B 2255/10; Y10T 428/1328; Y10T 428/1338; Y10T 428/1352; Y10T 428/1355; Y10T 428/1359

See application file for complete search history.

(56) References Cited

FOREIGN PATENT DOCUMENTS

| | | |
|---|---|---|
| JP | 2006-027695 A | 2/2006 |
| JP | 3817846 B2 | 9/2006 |
| JP | 2017-165059 A | 9/2017 |
| JP | 2017-165060 A | 9/2017 |
| JP | 2018-001422 A | 1/2018 |
| WO | WO 2014/175313 A1 | 10/2014 |

OTHER PUBLICATIONS

Japanese Patent Office, International Search Report in International Patent Application No. PCT/JP2019/008023 (dated May 14, 2019).

China National Intellectual Property Administration, The First Office Action in Chinese Patent Application No. 201980020626.X (dated Nov. 30, 2021).

European Patent Office, Extended European Search Report in European Patent Application No. 19776982.1 (dated Nov. 15, 2021).

China National Intellectual Propoerty Administration, First Office Action in Chinese Patent Application No. 201980020626.X (dated May 24, 2022).

Indonesia Directorate General of Intellectual Property, Notice of the Result of Substantive Examination in the Indonesian Patent Application No. P00202007952 (dated Jul. 28, 2022).

\* cited by examiner

LAMINATE BODY AND PACKAGING BAG USING THE SAME

CROSS-REFERENCE TO RELATED APPLICATIONS

This patent application is the U.S. national phase of International Patent Application No. PCT/JP2019/008023, filed Mar. 1, 2019, which claims the benefit of Japanese Patent Application No. 2018-059620, filed Mar. 27, 2018, which are incorporated by reference in their entireties herein.

TECHNICAL FIELD

The present invention relates to a polyester-based laminate body having an excellent gas barrier property and an excellent heat-sealing strength, and a packaging bag using the same.

BACKGROUND ART

Conventionally, in a lot of circulating articles represented by food products, pharmaceuticals, and industrial products, laminated films that are obtained by heat sealing or lamination of sealant films are used as a wrapping material such as a packaging bag or a capping material. On the innermost surface of the wrapping material (a surface in contact with the contents), a sealant layer including a polyolefin-based resin such as polyethylene or polypropylene, an ionomer, or a copolymer resin such as EMMA, which has high sealing strength, is disposed. It is known that these resins can provide a high adhesive strength by heat sealing.

However, a non-stretched sealant film including a polyolefin-based resin as described in Patent Document 1 has a high capability of adsorbing components including organic compounds such as oils and fats or a flavoring agent, and therefore has a drawback of having a tendency to alter the smell and taste of the contents. Thus, for the purpose of wrapping, for example, chemical products, pharmaceuticals, and food products, it is often inappropriate to use a sealant layer including a polyolefin-based resin as air innermost layer.

On the other hand, a sealant including an acrylonitrile-based resin as described in Patent Document 2 has a low capability of adsorbing organic compounds contained in, for example, chemical products, pharmaceuticals, and food products, and therefore is suitably used as the innermost layer of wrapping materials. However, the acrylonitrile-based film has a problem that heat-sealing strength is low at low temperatures (150° C. or less). In a bag making step, as heat-sealing temperature increases, more frequent maintenance is required, which is unfavorable from the viewpoint of productivity. In addition, the speed of a bag making line has been increased to improve the yield of bag making. For this requirement, a lower sealing temperature is also more preferred. However, the sealant formed from an acrylonitrile-based resin does not satisfy these requirements.

In view of these problems. Patent Document 3 discloses a polyester sealant that is incapable of adsorbing an organic compound and has a low-temperature sealing property. However, the sealant in Patent Document 3 has problems that, by the heat of heat sealing, the sealant not only experiences heat shrinkage but also is melted to create a hole. This is unfavorable, for example, for producing a packaging bag using the sealant, not only because if the sealant experiences heat shrinkage, the bag loses its shape, but also because if an opening is created, the bag cannot fulfil its storage function as a bag. As described above, in the sealant in Patent Document 3, there is a room for improvement in heat resistance.

Further, Patent Document 4 discloses a sealant having an improved heat resistance. The sealant in Patent Document 4 satisfies requirements of both a heat-sealing property and heat resistance by dividing layers into a layer having a heat-sealing property and other layers, and controlling raw material compositions of each of the layers independently. However, the sealant described in Patent Document 4 does not have a capability of blocking gases such as oxygen and water vapor (gas barrier property). Thus, there is a problem that the content has a short shelf life.

Conventionally, as a means for improving the gas barrier property of a film, a method of providing an inorganic thin film layer by vapor deposition is well known. For example. Patent Document 5 discloses a capping material in which, on a polyester film as a base material, a gas barrier layer including an inorganic oxide is formed by vapor deposition, and further a heat-sealing polymer film is laminated thereon. However, the material of the heat-sealing polymer film used in Patent Document 5 is polyethylene, and thus there is a problem with respect to incapability of adsorbing the content. On the other hand, Patent Document 6 discloses a laminate body having a sealant that includes a polyester material and is provided with an inorganic thin film layer to improve the gas barrier property. However, the present inventors have found that when a packaging hag is produced using the laminate body described in Patent Document 6 and the resulting packaging hag is subjected to heating treatment such as boiling treatment or retorting treatment, there are the following problems not only the packaging bag is deformed and the appearance is impaired by heat shrinkage of the sealant, but also cracks are formed in the inorganic thin film layer and the gas barrier property is decreased. That is, a film of a low adsorptive sealant having a gas barrier property and heat resistance cannot be produced by prior art.

PRIOR ART DOCUMENTS

Patent Documents

Patent Document 1: JP-B2-3817846
Patent Document 2: JP-A-H7-132946
Patent Document 3: WO 2014/175313 A
Patent Document 4: JP-A-2017-165059
Patent Document 5: JP-A-2006-27695
Patent Document 6: JP-A-2017-165060

SUMMARY OF THE INVENTION

Problems to be Solved by the Invention

An object of the present invention is to solve the problems of the prior art as described above. That is, an object of the present invention is to provide a laminate body that has a low capability of adsorbing components of the content and a high heat-sealing strength at low temperatures, and is excellent in gas barrier property, low heat-shrinkage property, and heat resistance. Also, an object of the present invention is to provide a packaging bag including the above-described laminate body as at least one layer, and to provide a laminate body in which an overcoat layer is laminated to the above-described laminate body, and a packaging bag including this laminate body as at least one layer.

Solution to the Problems

The constitutions of the present invention are as follows:
1. A laminated body having at least two or more different layers, wherein the laminate body is characterized by satisfying the following requirements (1) to (5):
   (1) the laminate body has a heat-sealing layer as at least one of the outermost layers, wherein the heat-sealing layer includes a polyester-based component containing ethylene terephthalate as a main constituent component, and when sealing is performed by bonding the heat-sealing layer together at 140° C. and 0.2 MPa for 2 seconds, the laminate body provides a sealing strength of 8 N/15 mm or more and 30 N/15 mm or less;
   (2) at least one layer other than the heat-sealing layer is an inorganic thin film layer;
   (3) the laminate body has a water vapor permeation rate of 0.1 g/m$^2$·d or more and 6 g/m$^2$·d or less under an atmosphere at a temperature of 40° C. and a relative humidity of 90% RH;
   (4) the laminate body has an oxygen permeation rate of 5 ml/m$^2$·d·MPa or more and 30 ml/m$^2$·d·MPa or less under an atmosphere at a temperature of 23° C. and a relative humidity of 65% RH; and
   (5) the laminate body has a heat shrinkage rate, after immersion in hot water at 98° C. for 3 minutes, of 5% or more and 5% or less in each of the longitudinal direction and the width direction.
2. The laminated body according to above 1, wherein a main component of inorganic compound constituting the inorganic thin film layer is silicon oxide, aluminum oxide, or aluminum.
3. The laminated body according to above 1 or 2, further comprising a heat-resistant layer in addition to the heat-sealing layer and the inorganic thin film layer, wherein the heat-resistant layer includes a polyester-based component containing ethylene terephthalate as a main constituent component
4. The laminated body according any one of above 1 to 3, wherein the laminate body has a fold holding angle of 20 degrees or more and 70 degrees or less.
5. The laminated body according any one of above 1 to 4, wherein monomer components of a polyester that constitutes the heat-sealing layer contains a diol component other than ethylene glycol and/or an acid component other than terephthalic acid.
wherein the diol component is at least one selected from the group consisting of neopentyl glycol, 1,4-cyclohexanedimethanol, 1,4-butanediol, and diethylene glycol and the acid component is isophthalic acid.
6. A packaging bag comprising the laminate body according to any one of above 1 to 5 as at least one layer.
7. The laminated body according to any one of above 1 to 5, wherein an overcoat layer is laminated the inorganic thin film layer.
8. A packing bag comprising the laminated body according to above 7 as at least one layer.

Effects Of The Invention

A laminate body of the present invention has a low capability of adsorbing components of the content and a high heat-sealing strength at low temperatures, and is excellent in gas barrier property, low shrinkage property, and heat resistance. Thus, when used as a packaging material, the laminate body can exert a high sealing strength. Further, for a long time after heating treatment, not only the amount of components of the content does not decrease, but also deterioration of the content can be prevented.

MODE FOR CARRYING OUT THE INVENTION

The present invention is a laminate body having at least two or more different layers, wherein the laminate body is characterized by satisfying the following requirements (1) to (5);
(1) the laminate body has a heat-sealing layer as at least one of the outermost layers, wherein the heat-sealing layer includes a polyester-based component containing ethylene terephthalate as a main constituent component, and when sealing is performed by bonding the heat-sealing layer together at 140° C. and 0.2 MPa for 2 seconds, the laminate body provides a sealing strength of 8 N/15 mm or more and 30 N/15 mm or less;
(2) at least one layer other than the heat-sealing layer is an inorganic thin film layer;
(3) the laminate body has a water vapor permeation rate of 0.1 g/m$^2$·d or more and 6 g/m$^2$·d or less under an atmosphere at a temperature of 10° C. and a relative humidity of 90% RH;
(4) the laminate body has an oxygen permeation rate of 5 ml/m$^2$·d·MPa or more and 30 ml/m$^2$·d·MPa or less under an atmosphere at a temperature of 23° C. and a relative humidity of 65% RH; and
(5) the laminate body has a heat shrinkage rate, after immersion in hot water at 98° C. for 3 minutes, of −5% or more and 5% or less in each of the longitudinal direction and the width direction.

The laminate body of the present invention is described below.

1. Layer Structure, Thickness, and Layer Ratio of Laminate Body

In order to achieve both a heat-sealing property and a gas barrier property, it is necessary that the laminate body of the present invention has at least one heat-sealing layer and at least one inorganic thin film layer. In addition, in order to achieve a predetermined heat-sealing strength, it is necessary that the heat-sealing layer is provided as at least one of the outermost layers in the laminate body. The inorganic thin film layer may be disposed as any of the outermost layers and intermediate layers (when there are three or more layers).

The layer structure of the laminate body of the present invention is preferably a 3-layer structure that is provided with a heat resistant layer in addition to the above-described two layers. The heat resistant layer is preferably formed from a polyester-based resin containing ethylene terephthalate as a main constituent component. The heat resistant layer may be disposed as any of the outermost layers and intermediate layers. Although structural elements of each layer are described below, when the structure includes a heat-sealing layer and a heat resistant layer, a layer containing the largest amount of the ethylene terephthalate component constitutes the heat resistant layer.

The layer structure of the laminate body of the present invention more preferably include a heat-sealing layer/a heat resistant layer/an inorganic material thin film layer in this order from one of the outermost layers.

In the laminate body of the present invention, an overcoat layer may be provided as an outermost layer on the side opposite to the heat-sealing layer. In this case, the laminate body preferably has a structure including laminated four layers that include a heat-sealing layer/a heat resistant layer/an inorganic thin film layer/an overcoat layer in this order. By providing the outermost layer, gas barrier property is improved. In addition, the outermost layer also brings, for example, the following merits; laminate strength is improved when laminated to other materials, and cracking due to abrasion or bending can be reduced.

The thickness of the laminate body is preferably, but not particularly limited to, 3 μm or more and 200 μm or less. When the thickness of the laminate body is less than 3 μm, heat-sealing strength may become insufficient, and processing such as printing may become difficult, which is more or less unfavorable. The thickness of the laminate body may be more than 200 μm. However, this is unfavorable because the amount of the laminate body used increases, which leads to increased cost. The thickness of the laminate body is more preferably 5 μm or more and 160 μm or less, and still more preferably 7 μm or more and 120 μm or less.

The heat-sealing layer preferably has a layer ratio, with respect to the total thickness of the laminate body, of 20% or more and 80% or less. When the layer ratio of the heat-sealing layer is less than 20%, the heat-sealing strength of the laminate body decreases, which is unfavorable. When the layer ratio of the heat-sealing layer is more than 80%, although the heat-sealing property of the laminate body increases, the heat resistance decreases, which is unfavorable. The layer ratio of heat-sealing layer is more preferably 30% or more and 70% or less.

The inorganic thin film layer preferably has a thickness of 2 nm or more and 100 nm or less. When the thickness of this layer is less than 2 nm, it becomes difficult to achieve a predetermined water vapor permeation rate and a predetermined oxygen transmission rate (gas barrier property), which is unfavorable. On the other hand, when the thickness of this layer exceeds 100 nm, there is no effect of improving the gas barrier property corresponding to the increased thickness, and the production cost increases, which is unfavorable. The thickness of the inorganic thin film layer is more preferably 5 nm or more and 97 nm or less, and still more preferably 8 nm or more and 94 nm or less.

The heat resistant layer preferably has a layer ratio of 20% or more and 80% or less. When the layer ratio of the heat resistant layer is less than 20%, the heat resistance of the film decreases, which is unfavorable. When the layer ratio of the heat resistant layer exceeds 80%, the layer ratio of the heat-sealing layer of the laminate body decreases instead, and thus the heat-sealing property is sacrificed and deteriorated, which is unfavorable. The layer ratio of the heat resistant layer is more preferably 30% or more and 70% or less.

When an overcoat layer is provided, the overcoat layer preferably has a thickness of 0.1 μm or more and 3 μm or less. When the thickness of the overcoat layer is less than 0.1 μm, it may become difficult to achieve a predetermined gas barrier property, or the laminate strength may decrease. On the other hand, the thickness of this layer exceeds 3 μm, there is a little effect of improvement in the gas barrier property or the laminate strength corresponding to the increased thickness, and the production cost increases, which is unfavorable.

In order to improve printability or lubricity of the surface of a film, a layer that has been subjected to, for example, corona treatment, coating treatment, or flame treatment can be provided as the outermost layer (including a heat-sealing layer) of the laminate body of the present invention, and the layer can be optionally provided without departing from the requirements of the present invention.

In the following description, the layers formed from a polyester-based resin, such as a heat-sealing layer and a heat resistant layer, are collectively referred to as "polyester-based resin layers", and distinguished from the inorganic thin film layer or the overcoat layer.

2. Characteristics of Laminate Body 2.1. Heat-Sealing Strength

In the laminate body of the present invention, when heat sealing is performed by bonding the heat-sealing layer together at a temperature of 140° C. and a seal bar pressure of 0.2 MPa for a sealing time of 2 seconds, the laminate body preferably provides a heat-sealing strength of 8 N/15 mm or more and 30 N/15 mm or less.

When the heat-sealing strength is less than 8 N/15 mm, the sealed portion is easily detached, and thus the laminate body cannot be used as a packaging bag. The heat-sealing strength is preferably 9 N/15 mm or more, and more preferably 10 N/15 mm or more. Although a larger heat-sealing strength is preferred, there is an upper limit, under the present circumstances, of about 30 N/15 mm.

2.2. Water Vapor Permeation Rate

It is necessary that the laminate body of the present invention has a water vapor permeation rate of 0.1 $g/m^2 \cdot d$ or more and 2 $g/m^2$ or less under an atmosphere at a temperature of 40° C. and a relative humidity of 90% RH. If the water vapor permeation rate exceeds 3 $g/m^2 \cdot d$, when the laminate body is used as a sack containing contents, shelf life of the contents is shortened, which is unfavorable. On the other hand, when the water vapor permeation rate is less than 0.1 $g/m^2 \cdot d$, a high gas barrier property can be achieved and the shelf life can be extended, which is favorable. However, 0.1 $g/m^2 \cdot d$ is the lower limit under the present technological circumstances. This lower limit of the water vapor permeation rate of 0.1 $g/m^2 \cdot d$ is thought to be practically sufficient. The upper limit of the water vapor permeation rate is preferably 2.8 $g/m^2 \cdot d$, and more preferably 2.6 $g/m^2 \cdot d$.

2.3. Oxygen Permeation Rate

It is necessary that the laminate body of the present invention has an oxygen permeation rate of 5 $ml/m^2 \cdot d \cdot MPa$ or more and 30 $ml/m^2 \cdot d \cdot MPa$ or less under an atmosphere at a temperature of 23° C. and a relative humidity of 65% RH. If the oxygen permeation rate exceeds 30 $ml/m^2 \cdot d \cdot MPa$, shelf life of the contents is shortened, which is unfavorable. On the other hand, when the oxygen permeation rate is less than 5 $ml/m^2 \cdot d \cdot MPa$, a high gas barrier property can be achieved and the shelf life can be extended, which is favorable. However, 5 $ml/m^2 \cdot d \cdot MPa$ is the lower limit under the present technological circumstances. This lower limit of the oxygen permeation rate of 5 $ml/m^2 \cdot d \cdot MPa$ is thought to be practically sufficient. The upper limit of the oxygen permeation rate is preferably 28 $ml/m^2 \cdot d \cdot MPa$, and more preferably 26 $ml/m^2 \cdot d \cdot MPa$.

2.4. Heat Shrinkage Rate

It is preferred that the laminate body of the present invention has a hot-water heat shrinkage rate of −5% or more and 5% or less in each of the width direction and the longitudinal direction when treated in hot water at 98° C. for 3 seconds. If the hot-water heat shrinkage rate exceeds 5%, when a bag produced by using the laminate body is subjected to heating treatment such as retorting treatment, not only the bag is severely deformed and the initial shape of the bag cannot be maintained, but also cracks are formed in the layer including an inorganic material and the gas barrier property is decreased, which is unfavorable. The hot-water heat shrinkage rate is preferably 4% or less, and more preferably 3% or less. On the other hand, when the hot-water heat shrinkage rate is lower than −5%, which means that the laminate body is expanded, it becomes difficult to maintain the initial shape of the bag as in the case where the shrinkage rate is high, which is unfavorable. The hot-water heat shrinkage rate of the laminate body is more preferably −4% or more and 4% or less, and still more preferably −3% or more and 3% or less.

2.5. Fold Holding Angle

The laminate body of the present invention preferably has a fold holding angle of 20 degrees or more and 70 degrees or less as measured by the method described below. When the fold holding angle exceeds 70 degrees, it becomes difficult to make a crease in the laminate body when a bag is formed, and thus the appearance is impaired, which is unfavorable. On the other hand, although a smaller fold holding angle is more preferred, the lower limit of the fold holding angle that can be covered by the present invention is 20 degrees. Even when the fold holding angle is 25 degrees or more, it is practically favorable. The upper limit of the fold holding angle is more preferably 65 degrees, and still more preferably 60 degrees.

3. Constituent Raw Material of Laminate Body 3.1. Raw Material Species of Polyester-Based Resin Layer The raw material species of the polyester based resin layer that constitutes the laminate body of the present invention include an ethylene terephthalate unit as a main constituent component. Herein, the words "as a main constituent component" means that a material is contained in an amount of 50% by mole or more based, on the total amount of constituent components as 100% by mole.

Further, the polyester used in the polyester-based resin layer of the present invention preferably contains, as a component other than ethylene terephthalate, at least one component. This is because the component other than ethylene terephthalate present in the polyester improves the heat-sealing strength of the heat-sealing layer. In the heat resistant layer, although the mount of the component other than ethylene terephthalate is preferably small, when the component other than ethylene terephthalate is contained, the difference in shrinkage rate between the polyester-based resin layer and the heat-sealing layer can be small, which leads to an effect of reducing curl of the laminate body. The content of each component differs between the heat-sealing layer and the heat resistant layer, and is described later. Examples of a dicarboxylic acid monomer, which can be the component other than ethylene terephthalate that constitutes ethylene terephthalate, include aromatic dicarboxylic acids such as isophthalic acid. 1,4-cyclohexanedicarboxylic acid, 2,6-naphthalenedicarboxylic acid, and orthophthalic acid; aliphatic dicarboxylic acids such as adipic acid, azelaic acid, sebacic acid, and decanedicarboxylic acid; and alicyclic dicarboxylic adds. However, it is preferred that no tri- or higher polyhydric carboxylic add (e.g., trimellitic add and pyromellitic add, and an anhydride or the like thereof) is contained in the polyester.

Among the above-described carboxylic acid components, isophthalic add is preferred because, when isophthalic add is used, a heat-sealing strength between the heat-sealing layers of 8 N/15 mm or more can be easily achieved.

Examples of a diol monomer, which can be the component other than ethylene glycol that constitutes ethylene terephthalate, include long chain diols such as neopentyl glycol, 1,4-cyclohexanedimethanol, diethylene glycol, 2,2-diethyl 1,3-propanediol, 2-n-butyl-2-ethyl-1,3-propanediol, 2,2-isopropyl-1,3-propanediol, 2,2-di-n-butyl-1,3-propanediol, hexanediol, and 1,4-butanediol; aliphatic diols such as hexanediol; and aromatic diols such as bisphenol A. However, it is preferred that no diol with 8 or more carbon atoms (e.g., octanediol or the like) or tri- or more polyhydric alcohol (e.g., trimethylolpropane, trimethylolethane, glycerin, diglycerin, or the like) is contained in the polyester.

Further, as a component that constitutes the polyester, polyester elastomers including ε-caprolactone, tetramethylene glycol, or the like may be contained. Since the polyester elastomer has an effect of lowering the melting point of the polyester-based resin layer, the polyester elastomer can be suitably used for, in particular, the heat-sealing layer.

Among these, neopentyl glycol, 1,4-cyclohexanedimethanol, 1,4-butanediol, and diethylene glycol are preferred because, when any one or more of neopentyl glycol, 1,4-cyclohexanedimethanol, 1,4-butanediol, and diethylene glycol are used, a heat-sealing strength between the heat-sealing layers of 8 N/15 mm or more can be easily achieved. Preferably, any one or more of neopentyl glycol and 1,4-cyclohexanedimethanol are used, and particularly preferably neopentyl glycol is used.

To the polyester-based resin layer that constitutes the laminate body of the present invention, various additives, such as waxes, an antioxidant, art antistatic agent, crystalline nucleating agent, a viscosity-reducing agent, a thermal stabilizer, a pigment for coloring, a coloring-preventing agent, an ultraviolet absorber, and the like can be added, if necessary. In addition, it is preferred that fine particles as a lubricant that improves slippiness of the film are added to at least the outermost layer of the film. As the fine particles, any fine particles may be selected. Examples of inorganic fine particles include silica, alumina, titanium dioxide, calcium carbonate, kaolin, barium sulfate, and the like. Examples of organic fine particles include acrylic-based resin particles, melamine resin particles, silicone resin particles, crosslinked polystyrene particles, and the like. The average particle size of the fine particles may be within a range of 0.05 to 3.0 μm as measured with a Coulter counter, and can be properly selected according to requirements.

As a method for blending the particles into the polyester-based resin layer that constitutes the laminate body of the present invention, for example, the particles can be added in any stage during the production of the polyester-based resin (resin). However, it is preferred that the particles are added, as a slurry dispersed in ethylene glycol or the like, in an esterification stage, or a stage after a transesterification reaction or before start of a polycondensation reaction, and the polycondensation reaction is allowed to proceed. In addition, examples of the method further include a method of blending a slurry of particles dispersed in ethylene glycol, water, or other solvents with polyester-based resin raw materials using a vented kneading extruder, a method of blending dried particles with polyester-based resin raw materials using a kneading extruder.

Preferred components contained in the heat-sealing layer and the heat resistant layer are described below.

3.2. Amount of Polyester Raw Material Component Contained in Heat-Sealing Layer

The polyester used in the heat-sealing layer that constitutes the laminate body of the present invention preferably contains a dicarboxylic add monomer and/or a diol monomer, which are components other than terephthalic acid and ethylene glycol that constitute ethylene terephthalate, in an amount of 30% by mole or more, more preferably 32% by mole or more, and particularly preferably 34% by mole or more. The upper limit of the content of the above-described monomers as components other than ethylene terephthalate is 50% by mole.

It is not preferable that the amount of the above-described monomers contained in the heat-sealing layer as components other than ethylene terephthalate is less than 30% by mole, because even when a molten resin is rapidly cooled and solidified after extruded from a die, the molten resin is crystallized in the following stretching and heat fixing step, and thus it becomes difficult to achieve a heat-sealing strength of 8 N/15 mm or more.

On the other hand, when the amount of the above-described monomers contained in the heat-settling layer as components other than ethylene terephthalate is 50% by mole or more, the film can have a high beat-sealing strength. However, since the heat resistance of the heat-sealing layer becomes extremely low, blocking (a phenomenon in which sealing occurs in an area that is broader than an intended area by heat conducted from a heating member) occurs around the sealing portion when heat sealing is performed, and thus an appropriate heat sealing becomes difficult The content of the monomers as components other than ethylene terephthalate is more preferably 48% by mole or less, and particularly preferably 46% or less.

3.3. Amount of Polyester Raw Material Component Contained in Heat Resistant Layer The polyester used in the heat resistant layer that can constitute the laminate body of the present invention preferably contains a dicarboxylic acid monomer and/or a diol monomer, which are components other than terephthalic acid and ethylene glycol that constitute ethylene terephthalate, in an amount of 9% by mole or more, more preferably 10% by mole or more, and particularly preferably 11% by mole or more. The upper limit of the content of the above described monomers as components other than ethylene terephthalate is 20% by mole.

It is not preferable that the amount of the above-described monomers contained in the heat resistant layer as components other than ethylene terephthalate is less than 9% by mole, because the difference in heat shrinkage rate between the heat resistant layer and the heat-sealing layer becomes larger, which leads to a stronger curl of the laminate body. When the difference in amount of the above-described monomers, which are components other than ethylene terephthalate, contained in the heat resistant layer and the heat-sealing layer becomes larger, the difference in heat shrinkage rate among each of the layers during heat fixing becomes larger. Thus, even when the laminate body is cooled efficiently after the heat fixing, the shrinkage on the heat-sealing layer side becomes larger, which leads to a stronger curl of the laminate body.

On the other hand, when the amount of the above-described monomers contained in the heat resistant layer as components other than ethylene terephthalate is 20% by mole or more, the heat resistance of the sealant decreases, and thus, for example, an opening is created by heat applied during heat sealing, which is unfavorable. The content of the above-described monomers as components other than ethylene terephthalate is more preferably 19% by mole or less, and particularly preferably 18% by mole or less.

Although the content of the above-described monomers as components other than ethylene terephthalate in the above described each single layer is as described above, the difference in content of the monomers between the heat-sealing layer and the heat resistant layer for controlling the curl is more preferably 20% by mole or more and 35% by mole or less, and still more preferably 21% by mole or more and 34% by mole or less.

3.4. Raw Material Species and Composition of Inorganic Thin Film Layer

Species of the raw material of the inorganic thin film layer that constitutes the laminate body of the present invention are not particularly limited, and previously known materials can be used and can be properly selected according to purposes to satisfy a desired gas barrier property or the like. Examples of the species of the raw materials of the inorganic thin film layer include metals such as silicon, aluminum, tin, zinc, iron, manganese, and the like; and an inorganic compound containing one or more of these metals. Examples of the inorganic compound include an oxide, a nitride, a carbide, a fluoride, and the like. These inorganic materials or inorganic compounds may be used alone or in combination of two or more. In particular, a silicon oxide and an aluminum oxide are preferred because transparency of the laminate body can be improved when they are used alone (as a single body) or in combination (as a binary body). When the components of the inorganic compound include a silicon oxide and an aluminum oxide, the content of the aluminum oxide is preferably 20% by mass or more and 80% by mass or less, and more preferably 25% by mass or more and 70% by mass or less. When the content of the aluminum oxide is 20% by mass or less, the density of the inorganic thin film layer decreases, and the gas barrier property may be decreased, which is unfavorable. On the other hand, the content of the aluminum oxide is 80% by mass or more, the flexibility of the inorganic thin film layer is decreased, thus cracks may be formed easily, and consequently the gas barrier property may be decreased, which is unfavorable.

It is preferred that the oxygen/metal elemental ratio of a metal oxide used in the inorganic thin film layer is 1.3 or more and less than 1.8 because unevenness in gas barrier property is small and an excellent gas barrier property can be always achieved. The oxygen/metal elemental ratio can be obtained by measuring the amounts of oxygen and the metal element by X-ray photoelectron spectroscopy (XPS), and calculating the oxygen/metal elemental ratio.

3.5. Kinds of Overcoat Layer

Kinds of the overcoat layer that can constitute the laminate body of the present invention are not particularly limited, and previously known materials can be used and can be properly selected according to purposes to satisfy a desired gas barrier property or the like. Examples of the previously known materials include a composition including a urethane-based resin and a silane coupling agent, a compound including organosilicon and a hydrolysate thereof, and a water-soluble polymer having a hydroxyl group or a carboxyl group. Among these, the composition including a urethane-based resin and a silane coupling agent is preferred because the gas barrier property of the laminate body can be improved while the flexibility is maintained.

In addition, to the overcoat layer, one or more of various additives can be added to impart antistatic property, ultraviolet absorption property, color, thermal stability, lubricity, or the like as long as the objects of the present invention are not. compromised. Kinds and amounts of the various additives added can be properly selected according to desired objects.

4. Conditions for Producing Laminate Body

4.1. Conditions for Producing Polyester-Based Resin Layer

4.1.1. Melt Extrusion

The polyester-based resin layer that constitutes the laminate body of the present invention (hereinafter, sometimes simply referred to as a "film") can be obtained by melt extruding the polyester raw materials described in the above-described section 3.1. "Raw Material Species of Polyester-based Resin Layer" with an extruder to form an unstretched laminated film, and stretching the unstretched laminated film by the prescribed method described below. When the film contains a heat-sealing layer and a heat resistant, layer, or other layers, each of the layers may be laminated either before or after stretching. When the layers are laminated before the stretching, the layers are preferably laminated by using a method including melt extruding a resin that is a raw material of each layer with a different extruder, and mating the resulting layers to each other using a feed block or the like in the course of the resin flow channel. When the layers are laminated after stretching, the layers are preferably laminated by using a lamination method including bonding films that have been formed separately to each other with an adhesive, or an extrusion lamination method including spreading a molten polyester resin on the surface of a separate film or laminated films to laminate the layers. Among these, the method including laminating the layers before stretching is preferred.

The polyester resin can be obtained by, as described above, selecting kinds and amounts of the dicarboxylic acid component and the diol component so that appropriate amounts of monomers, which can be components other than ethylene terephthalate, are contained, and performing polycondensation. In addition, two or more chip shaped polyesters can be mixed and used as raw materials of the polyester-based resin layer.

When the raw material resins are melt extruded, the polyester raw material of each layer is preferably dried by using a dryer such as a hopper dryer, a paddle dryer, or the like, or a vacuum dryer. The polyester raw material of each layer is dried as described above, then melted at a temperature of 200 to 300° C. using an extruder, and extruded as a laminated film. For the extrusion, any previously known method such as a T-die method, a tubular method, or the like may be used.

Thereafter, by rapidly cooling the film melted by extrusion, an unstretched film can be obtained. As the method for rapidly cooling the molten resin, a method of casting the molten resin from an outlet to a rotary drum, and rapidly cooling and solidifying the molten resin to obtain a substantially unoriented resin sheet can be preferably used.

The film may be formed by any methods including no stretching, uniaxial stretching (stretching in at least one direction of the lengthwise (longitudinal) direction and the transverse (width) direction), and biaxial stretching. From the viewpoint of mechanical strength and productivity of the laminate body of the present invention, the uniaxial stretching is preferred, and the biaxial stretching is more preferred. Hereinafter, a successive biaxial stretching method in which lengthwise stretching is performed first and transverse stretching is performed next (i.e., lengthwise stretching-transverse stretching) is described. However, the order of the lengthwise stretching and the transverse stretching may be reversed (i.e., transverse stretching-lengthwise stretching) because this merely leads to change in the main orientation direction. Alternatively, a simultaneous biaxial stretching method can be used.

4.1.2. Lengthwise Stretching

Stretching in the lengthwise direction (longitudinal direction) may be performed by introducing an unstretched film into a lengthwise stretching machine in which a plurality of roll groups are arranged consecutively. In the lengthwise stretching, it is preferred to perform preliminary heating with a preheating roll until the film temperature reaches 65° C. to 90° C. When the film temperature is lower than 65° C., the film is less extensible during stretching in the lengthwise direction and becomes susceptible to breakage, which is unfavorable. On the other hand, when the temperature is higher than 90° C., the film readily adhesively attaches to a roll, and the film is easily wound around the roll or the roll is easily smudged by continuous production, which is unfavorable.

When the film temperature reaches 65° C. to 90° C., the lengthwise stretching is performed. The lengthwise stretch ratio is preferably 1 time or more and 5 times or less. A lengthwise stretch ratio of 1 time corresponds to no lengthwise stretching. Thus, when the lengthwise stretch ratio is 1 time, a transverse uniaxial stretched film is obtained. A lengthwise stretching of 1.1 times or more provides a biaxially stretched film. The upper limit of the lengthwise stretch ratio is not particularly limited. However, when the lengthwise stretch ratio is excessively high, the film is less extensible in the transverse stretching and becomes susceptible to breakage. Thus, the lengthwise stretch ratio is preferably 5 times or less.

When the film is loosened in the longitudinal direction (relaxation in the longitudinal direction) after the lengthwise stretching, the rate of shrinkage in the film longitudinal direction that has occurred during the lengthwise stretching can foe reduced. Further, the relaxation in the longitudinal direction can reduce bowing phenomena (distortion) that occurs in a tenter. This is because since, in the transverse stretching and the final heat treatment in the following steps, the film is heated while both ends of the film in the width direction is grasped, only a midportion of the film shrinks in the longitudinal direction. The relaxation rate in the longitudinal direction is preferably 0% or more and 70% or less (a relaxation rate of 0% means no relaxation is performed). The upper limit of the relaxation rate in the longitudinal direction depends on raw materials used and lengthwise stretching conditions, and the relaxation exceeding this upper limit cannot be performed. In the polyester sealant of the present invention, the upper limit of the relaxation rate in the longitudinal direction is 70%. The relaxation in the longitudinal direction can be performed by beating the lengthwise stretched film at a temperature of 65° C. to 100° C. or less, and controlling the difference in speed of rolls. As heating means, any of a roll, near-infrared rays, far-infrared rays, a hot air heater, or the like can be used. The relaxation in the longitudinal direction can be performed not only directly after the lengthwise stretching, but also, for example, in the transverse stretching (including a preheating zone) or the final heat treatment by narrowing a gap between clips in the longitudinal direction (in this relaxation, since both ends of the film in the width direction are also relaxed in the longitudinal direction, bowing distortion is reduced). That is, the relaxation in the longitudinal direction can be performed at any timing.

After the relaxation in the longitudinal direction (or after the lengthwise stretching when the relaxation is not performed), the film is preferably temporarily cooled. The film is preferably cooled with a cooling roll having a surface temperature of 20 to 40° C.

4.1.3. Transverse Stretching

It is preferred that, after the lengthwise stretching, transverse stretching is performed at a stretch ratio of about 3 to 5 times at 65° C. to 110° C. while the film is grasped by dips at both end edges in the width direction (in a direction orthogonal to the longitudinal direction) in a tenter. It is preferred that, before performing the stretching in the transverse direction, preliminary heating is performed. The preliminary heating is preferably performed until the surface temperature of the film reaches 75° C. to 120° C.

It is preferred that, after the transverse stretching, the film is passed through an intermediate zone in which active heating operation is not performed. Since the temperature in the final heat treatment zone that follows the transverse stretch zone in the tenter is higher than that in the transverse stretch zone, the heat (a hot blast itself or radiation heat) of the final heat treatment zone flows to a transverse stretching step if the intermediate zone is not provided. In this case, since the temperature in the transverse stretch zone does not become stable, not only the accuracy in thickness of the film is deteriorated, but also the physical properties such as the heat-sealing strength and the shrinkage rate varies. Thus, it is preferred that the transverse stretched film is passed through the intermediate zone for allowing a predetermined period of time to elapse before performing the final heat treatment. In the intermediate zone, it is important to block an accompanying flow, which accompanies running of the film, and a hot blast from the transverse stretch zone and the final heat treatment zone such that a strip-shaped piece of paper can be hung in the almost completely vertical direction when the piece of paper is hung while the film is not passing through the intermediate zone. It is sufficient for the film to pass through the intermediate zone in a time of about 1 second to 5 seconds. When the time is less than 1 second, the length of the intermediate zone is insufficient, which results in a shortage of the heat blocking effect. On the other hand, a longer intermediate zone is more preferred. However, when the intermediate zone is too long, a huge facility is required. Thus, a time of about 5 seconds is sufficient.

4.1.4. Final Heat Treatment

It is preferred that, after passing through the intermediate zone, the film is preferably subjected to a heat treatment at a temperature of transverse stretching temperature or higher and 250° C. or less in the final heat treatment zone. When the heat treatment temperature is lower than the transverse stretching temperature, the heat treatment does not give no effect as a heal treatment. In this case, the hot-water shrinkage rate of the film at 80° C. becomes higher than 5%, which is unfavorable. The shrinkage rate of the film decreases as the heat treatment temperature increases. However, when the heat treatment temperature exceeds 250° C., the haze of the film may exceed 15%, or the film may melt during the final heat treatment step and drop in the tenter, which is unfavorable.

It is possible to reduce the shrinkage rate in the width direction by narrowing a gap between clips in the tenter (relaxation in the width direction) at any rate during the final heat treatment. Thus, it is preferred that, in the final heat treatment, the relaxation in the width direction is performed within a range of 0% or more and 10% or less (a relaxation rate of 0% means no relaxation is performed). The shrinkage rate in the width direction decreases as the relaxation rate in the width direction increases. However, the upper limit of the relaxation rate (a shrinkage rate of the film in the width direction immediately after the transverse stretching) depends on raw materials used, stretching conditions in the width direction, and the heat treatment temperature, and the relaxation exceeding the upper limit cannot be performed. In the polyester sealant of the present invention, the upper limit of the relaxation rate in the width direction is 10%.

It is preferred that the film passes through the final heat treatment zone in a time of 2 seconds or more and 20 seconds or less. When the passing time is less than 2 seconds, the film passes through the heat treatment zone before the surface temperature of the film reaches a setting temperature, so that the heat treatment becomes meaningless. The effect of the heat treatment increases as the passing time becomes longer. Thus, the passing time is preferably 2 seconds or more, and more preferably 5 seconds or more. However, a longer passing time leads to a much larger facility, and practically a time of 20 seconds or less is sufficient.

4.1.5. Cooling

It is preferred that, after passing through the final heat treatment zone, the film is preferably cooled by a cooling wind at 10° C. or more and 30° C. or less in a cooling zone. In this cooling, it is preferred that the cooling efficiency is improved by lowering the temperature of the cooling wind or increasing the wind velocity so that the measured temperature of the film at an exit of the tenter is lower than the lower of glass transition temperatures of the heat-sealing layer and the heat resistant layer. This measured temperature refers to the surface temperature of the film as measured with, a noncontact radiation thermometer. When the measured temperature of the film at an exit of the tenter exceeds the glass transition temperature, heat shrinkage of the film occurs when both end portions grasped by clips are released. In this case, the film curls toward the heat-sealing layer that has a larger heat shrinkage rate, and the radius of curvature of the film becomes smaller, which is unfavorable.

It is preferred that the film passes through the cooling zone in a time of 2 seconds or more and 20 seconds or less. When the passing time is less than 2 seconds, the film passing through the cooling zone before the surface temperature of the film reaches the glass transition temperature, so that the radius of curvature becomes smaller. The cooling effect increases as the passing time becomes longer. Thus, the passing time is preferably 2 seconds or more, and more preferably 5 seconds or more. However, a longer passing time leads to a much larger facility, and practically a time of 20 seconds or less is sufficient. Thereafter, the film is wound while both ends of the film are cut and removed to give a film roll.

4.2. Method for Producing Inorganic Thin Film Layer

The method for producing the inorganic thin film layer in the laminate body of the present invention is not particularly limited, and previously known production methods can be used as long as the objects of the present invention are not compromised. Examples of the method include physical vapor deposition methods (PVD methods) such as a vacuum deposition method, a sputtering method, and ion plating; chemical vapor deposition methods (CVD methods); and the like. In particular, from the viewpoint of production rate and safety, the vacuum deposition method is preferred. As a heating method in the vacuum deposition method, resistance heating, high frequency induction heating, electron beam heating, and the like can be used. Further, as a reactive gas, oxygen, nitrogen, water vapor, or the like may be introduced, in addition, reactive deposition using a means such as ozone addition or ion assist may be used. Further, the deposition conditions may be changed, so that, for example, bias or the like is applied to the substrate, or the substrate temperature is increased or decreased, as long as the objects of the present invention are not compromised.

4.3. Method for Producing Overcoat Layer

The method for laminating the overcoating to the laminate body of the present invention is not particularly limited, and previously known coating methods, such as a gravure coating method, a reverse coating method, a dipping method, a roll coating method, the air knife coating method, a comma coating method, a screen printing method, a spray coating method, a gravure offset method, a die coating method, a bar coating method, and the like, can be used. The methods can be properly selected according to desired objects.

As a drying method, methods of applying heat, such as hot air drying, heat-roll drying, high frequency irradiation, infrared irradiation, and UV irradiation, can be used alone or in combination of two or more. In the drying method, the heating temperature is preferably in a range of about 60° C. or more and 200° C. or less, and more preferably in a range of about 80° C. or more and 180° C. or less. When the drying temperature is 60° C. or more, a desired barrier property can be achieved, which is favorable. When the drying temperature is 180° C. or less, no deformation of the base material occurs or no crack is formed in the evaporated film if the vapor deposition time is short, which is favorable.

5. Construction of Packaging Bag and Method for Making Bag

The laminate body having the above-described characteristics can be suitably used as a packaging hag. Although the laminate body of the present invention may be formed into a bag solely, other materials may be laminated to the laminate body. Examples of the above-described other layers that constitute a laminate body include, but are not limited to, a non-stretched film that contains polyethylene terephthalate as a constituent component, a non-stretched, uniaxially stretched, or hi axially stretched film that contains a different amorphous polyester as a constituent component, a non-stretched, uniaxially stretched, or biaxially stretched film that contains nylon as a constituent component, and a non-stretched, uniaxially stretched, or biaxially stretched film that contains polypropylene as a constituent component. The method for rising the laminate body for a packaging bag is not particularly limited, and previously known production methods, such as an application production method, a laminating method, a heat-sealing method, can be used.

In the packaging bag, at least a part of the packaging bag may be constituted by a laminate body according to the present invention. However, a constitution in which the above-described laminate body is present throughout the packaging bag is preferred because the gas barrier property of the packaging bag is improved. The laminate body of the present invention may be present as any of the layers. However, from the viewpoint of incapability of adsorbing the content and sealing strength in forming a bag, a constitution in which the heat-sealing layer of the laminate body of the present invention is the innermost layer of a bag is preferred. The method for making a packaging bag including the laminate body of the present invention is not particularly limited, and previously known production methods, such as heat sealing using a heat bar (heat jaw), bonding using hot melt, and center sealing by a solvent, can be used.

The packaging bag including the laminate body of the present invention can be suitably used as packaging materials for various articles such as food products, pharmaceuticals, and industrial products.

EXAMPLES

Next, the present invention is specifically described with reference to Examples and Comparative Examples. However, the present invention is not limited to the embodiments of the examples in any way, and modifications can be suitably made without departing from the spirit of the present invention.

The methods for evaluating the laminate bodies are as follows. When the longitudinal direction and the width direction of the laminate body cannot be immediately determined because, for example, the area of the laminate body is small, measurement may be performed by defining the longitudinal direction and the width direction based on assumption. Even when each of the assumed longitudinal direction and the assumed width direction has a deviation of 90 degrees from the actual direction, there is no particular problem.

<Method for Evaluating Laminate Body>

[Heat-Sealing Strength]

The heat-sealing strength was measured according to JIS Z1707. The specific procedure was as follows. The heat seal surfaces of a sample was bonded together with a heat sealer. Heat seal conditions were as follows: an upper bar temperature of 140° C., a lower bar temperature of 30° C. a pressure of 0.2 MPa, and a time of 2 seconds. The sample was cut into an adhesion sample having a seal width of 15 mm. The peel strength was measured with a tension speed of 200 mm/min using a universal tensile testing machine "DSS-100" (manufactured by SHIMADZU CORPORATION). The peel strength was shown as strength per 15 mm (N/1.5 mm).

[Water Vapor Permeation Rate]

The water vapor permeation rate was measured according to JIS K7126 B method. The water vapor permeation rate was measured using a water vapor permeation analyzer (PERMATRAN-W3/33MG manufactured by MOCON Inc.) under an atmosphere at a temperature of 40° C. and a humidity of 90% RH with a humidity controlled gas permeating through the laminate body in a direction from the heat-sealing layer side to the in organic thin film layer side. Before the measurement, the sample was left to stand under an atmosphere at a humidity of 65% RH for 4 hours to control humidity.

[Oxygen Permeation Rate]

The oxygen permeation rate was measured according to JIS K7126-2 method. The oxygen permeation rate was measured using an oxygen permeation testing analyzer (OX-TRAN 2/20 manufactured by MOCON) under an atmosphere at a temperature of 23° C. and a humidity of 65% RH with oxygen permeating through the laminate body in a direction from the heat-sealing layer side to the inorganic thin film layer side. Before the measurement, the sample was left to stand under an atmosphere at a humidity of 65% RH for 4 hours to control humidity.

[Hot-Water Heat Shrinkage Rate]

The sample was cut into a 10 cm×10 cm square, and immersed in hot water at 98±0.5° C. for 3 minutes under no-load state to shrink, thereafter immersed in water at 25° C.±0.5° C. for 10 seconds, and retrieved from water. Then, the dimensions of the sample in the lengthwise and transverse directions were measured, and the heat shrinkage rate in each direction was calculated according to the following formula 1. The measurement was repeated twice to obtain the average value.

Shrinkage rate=((Length before shrinkage-Length after shrinkage)/Length before shrinkage)×100 (%)　　　Formula 1

The heat shrinkage rates in the lengthwise and transverse directions were evaluated according to the following criteria. The criteria for the evaluation were as follows.

Evaluation symbol ○: Heat shrinkage rate of 5% or less

Evaluation symbol x: Heat shrinkage rate of 5% or more

[Fold Holding Angle]

Figure 1:
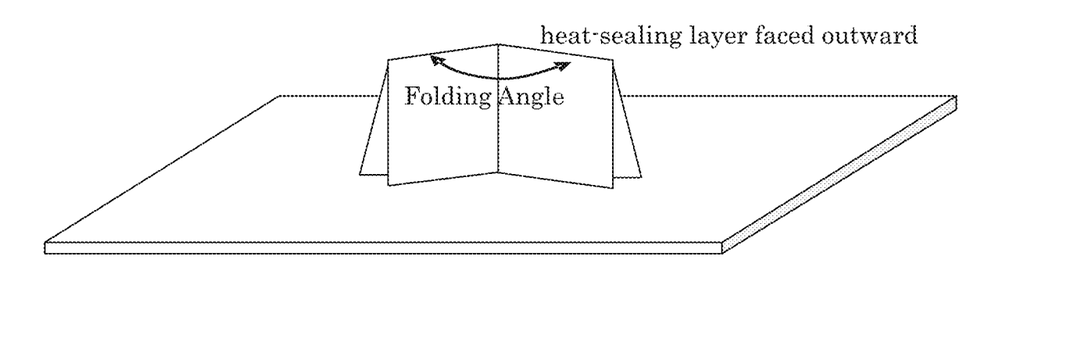
FIG. 1 is a schematic illustration showing a method for measuring a fold holding angle.

A sample was left to stand in a thermostatic chamber under an atmosphere at 28° C. and 50% RH for 24 hours. Immediately thereafter, the sample was cut into a 10 cm×10 cm square under an atmosphere at 20° C. and 65% RH, and folded in four (a 5 cm×5 cm square). The sample was folded such that the short side of a rectangle formed by the first folding in two lay along the longitudinal direction and the heat-sealing layer faced outward. Thereafter, the sample folded in four was sandwiched between two plates of glass each having sides of 10 cm×15 cm and a thickness of 2 mm, and a 5 kg weight was placed on the glass to press for 10 seconds. The weight on the sample folded in four was removed, and thereafter the angle formed between two planes of the sample that had opened with respect to the last folded line as a center was measured as shown in FIG. 1. When the sample has been completely folded, the angle is 0 degrees. When the sample has completely opened, the angle is 180 degrees.

[Heat Resistance Evaluation]

The heat-sealing layer (surface) of the sample and the unstretched polyethylene terephthalate sheet (200 μm, without surface treatment such as coating treatment or corona treatment) were allowed to face each other, anti heat sealing was performed with a bar of a heat sealer. Heat seal conditions were as follows: an upper bar temperature of 230° C. a lower bar temperature of 30° C., a pressure of 0.6 MPa and a time of 1 second. From the appearance of the seal line of the adhered sample, the heat resistance was visually evaluated. The heat resistance was evaluated by whether there was an opening in the sample or not. The criteria for the evaluation were as follows.

Evaluation symbol ○: No opening
Evaluation symbol x: Opening appeared

[Adsorptivity]

The sample was cut into a 10 cm×10 cm square, and the weight of the sample was measured. Then, the sample was immersed in a vessel charged with 500 ml of a solution of limonene (manufactured by NACALAI TESQUE, INC.) and menthol (manufactured by NACALAI TESQUE, INC.) prepared by adding ethanol so that each of the limonene and the menthol had a concentration of 30%, and the sample was retrieved after 1 week.

The retrieved sample was blotted with BEMCOT to remove the solution, and dried in a room at a temperature of 23° C. and a humidity of 60% RH for one day. After the drying, the weight of the sample was measured, and the difference in weight of the sample calculated according to the following formula 2 was designated as the amount of adsorption.

Amount of adsorption=Sample weight after immersion·Sample weight before immersion          Formula 2

The amount of adsorption was evaluated as follows.
Evaluation symbol ○: 0 mg or more and 5 mg or less
Evaluation symbol Δ: more than 5 mg and 10 mg or less
Evaluation symbol x: more than 10 mg <Preparation of Polyester Raw Materials>

SYNTHESIS EXAMPLE 1

A stainless steel autoclave equipped with a stirrer, a thermometer and a partial reflux cooler was charged with 100% by mole of dimethyl terephthalate (DMT) as a dicarboxylic acid component and 100% by mole of ethylene glycol (EG) as a polyhydric alcohol component such that the amount of ethylene glycol was 2.2 times as much as the amount of dimethyl terephthalate by molar ratio, and a transesterification reaction was carried out using 0.05% by mole (relative to the add component) of zinc acetate as a transesterification catalyst while generated methanol was distilled off from the system. Thereafter, 0.225% by mole (with relative to the acid, component) of antimony trioxide as a polycondensation catalyst was added, and a polycondensation reaction was carried out at 280° C. under a reduced pressure of 26.7 Pa to afford a polyester (A) having an intrinsic viscosity of 0.75 dl/g. This polyester (A) was polyethylene terephthalate. The composition of the polyester (A) is shown in Table 1.

SYNTHESIS EXAMPLE 2

Polyesters (B) to (E) were obtained as in Synthesis Example 1, except that different monomers were used instead. The compositions of each of the polyesters are shown in Table 1. In Table 1, TPA represents terephthalic add, BD represents 1,4-butanediol, NPG represents neopentyl glycol, CHDM represents 1,4-cyclohexanedimethanol, and DBG represents diethylene glycol. In the production of the polyester (E), $SiO_2$ (Sylysia 266 manufactured by Fuji Silysia Chemical Ltd.) was added as a lubricant in an amount of 7,000 ppm with respect to the polyester. Each of the polyesters was suitably formed into a chip shape. The compositions of the polyesters (B) to (E) are shown in Table 1.

TABLE 1

| Polyester raw material | Raw material composition of polyester (mol %) | | | | | | Amount of lubricant added (ppm) |
|---|---|---|---|---|---|---|---|
| | Dicarboxylic acid component | Diol component | | | | | |
| | TPA | EG | BD | NPG | CHDM | DEG | |
| A | 100 | 99 | 0 | 0 | 0 | 1 | 0 |
| B | 100 | 68 | 0 | 30 | 0 | 2 | 0 |
| C | 100 | 67 | 0 | 0 | 30 | 3 | 0 |
| D | 100 | 0 | 100 | 0 | 0 | 0 | 0 |
| E | 100 | 99 | 0 | 0 | 0 | 1 | 7000 |

[Film 1]

As raw materials of a heat-sealing layer, polyester A, polyester B, polyester D, and polyester E were mixed in a mass ratio of 10:60:24:6. As raw materials of a heat resistant layer, polyester A, polyester B, polyester D, and polyester E were mixed in a mass ratio of 57:31:6:6.

The mixed raw materials of the heat-sealing layer and the heat resistant layer were each introduced into different biaxial screw extruders separately, and both were melted at 270° C. The molten resins were mated to each other using a feed block in the course of the flow channel, discharged from a T-die, and cooled on a chili roll with a surface temperature setting of 30° C. to give an unstretched laminated film. The flow channels of the molten resins were arranged such that the laminated film had the heat-sealing layer on one side and the heat resistant layer on the other side (a two-kind-two-layer structure of heat-sealing layer/heat resistant layer), and the amount discharged was adjusted such that the ratio between the thickness of the heat-sealing layer to the thickness of the heat resistant layer became 50/50.

The unstretched laminated film obtained by cooling and solidification was guided to a lengthwise stretching machine in which a plurality of roll groups were arranged consecutively, subjected to preliminary beating on a preheating roll until the film temperature reached 78° C., and then stretched to 4.1 times. The film that had been just stretched lengthwise was allowed to enter a heating furnace in which the temperature was adjusted to 100° C. by a hot air heater, and a 20% relaxation treatment in the longitudinal direction was performed through the use of the difference in speed between a roll at an entrance and a roll at an exit of the heating furnace. Thereafter, the lengthwise stretched film was subjected to forced cooling by a cooling roll in which the surface temperature was adjusted to 25° C.

The relaxation-treated film was guided to a transverse stretching machine (tenter), and subjected to preliminary heating for 5 seconds until the surface temperature reached 105° C., and then stretched in the width direction (transverse direction) to 4.0 times. The transverse stretched film was directly guided to an intermediate zone, and allowed to pass through the zone in 1.0 second. In the intermediate zone of the tenter, a hot blast front the final heat treatment zone and a hot blast from the transverse stretch zone were blocked such that a strip-shaped piece of paper was hung in the almost completely vertical direction when the piece of paper was hung while the film was not passing through the intermediate zone.

Thereafter, the film that had been passed through the intermediate zone was guided to the final heat treatment zone, and subjected to heat treatment at 190° C. for 5 seconds. While this heat treatment was performed, a 3% relaxation treatment in the width direction was performed concurrently by narrowing a gap between clips in the film width direction. The film that, had passed through the final heat treatment zone was cooled by a cooling wind at 30° C. for 5 seconds. The film at an exit of the tenter had a measured temperature of 45° C. The film was wound in a roll shape with a width of 500 mm while both ends of the film was cut and removed to produce a biaxially stretched film having a thickness of 30 μm, and this production was continued until the film reached a predetermined length. The characteristics of the resulting film were evaluated according to the above-described methods. The production conditions are shown in Table 2.

[Films 2 to 6]

Films 2 to 6 were produced as in Film 1, except that various changes were made in the blending ratio of raw materials, the layer structure, the conditions for the lengthwise stretching, the conditions for the relaxation in the longitudinal direction, the conditions for the transverse stretching, the conditions for the final heat treatment, and the cooling conditions to form the polyester-based films. The production conditions for each film are shown in Table 2. The Films 2 and 3 were laminated films as in Film 1, and Films 4 and 5 are single layer films of the heat-sealing layer or the heat resistant layer.

[Film 7]

As Film 7, PYLEN (registered trademark) Film-CT P1128 having a thickness of 20 μm (manufactured by TOYOBO CO., LTD.) was used. Film 7 is shown in Table 2 together with Films 1 to 6.

TABLE 2

|  |  | Film 1 | Film 2 | Film 3 | Film 4 | Film 5 | Film 6 | Film 7 |
|---|---|---|---|---|---|---|---|---|
| Raw material composition heat-sealing layer (layer A) (% by mass) | Polyester A | 10 | 10 | 26 | 0 | — | 10 | P1128 (olefin) |
|  | Polyester B | 60 | 60 | 0 | 100 | — | 75 |  |
|  | Polyester C | 0 | 0 | 48 | 0 | — | 0 |  |
|  | Polyester D | 24 | 24 | 20 | 0 | — | 10 |  |
|  | Polyester E | 6 | 6 | 6 | 0 | — | 5 |  |
| Raw material composition of heat resistant layer (layer B mass %) | Polyester A | 57 | 47 | 47 | — | 100 | 55 |  |
|  | Polyester B | 31 | 0 | 0 | — | 0 | 30 |  |
|  | Polyester C | 0 | 41 | 41 | — | 0 | 0 |  |
|  | Polyester D | 6 | 6 | 6 | — | 0 | 10 |  |
|  | Polyester E | 6 | 6 | 6 | — | 0 | 5 |  |
| Amount of monomer components other than ethylene glycol (mol %) | Heat-sealing layer | 41.1 | 41.1 | 34.0 | 33.0 | — | 22.7 |  |
|  | Heat resistance layer | 14.6 | 18.0 | 18.0 | — | 1.0 | 8.8 |  |
|  | Difference (heat-sealing layer heat resistant layer) | 26.5 | 23.1 | 16.0 | — | — | 13.9 |  |
|  | Layer structure | A/B | A/B | A/B | A | B | A/B/A |  |
|  | Ration of extruded raw material resins (heat-sealing layer (%)/heat resistant layer (%)) | 50/50 | 50/50 | 50/50 | 100/0 | 0/100 | 50/50 |  |
| Lengthwise stretching | Stretching temperature (° C.) | 78 | 78 | 82 | 75 | 90 | 90 |  |
|  | Stretch ratio | 4.1 | 4.1 | 4.1 | 4.1 | 3.8 | 4.1 |  |
| Relaxation in the longitudinal direction | Temperature of heating furnace (° C.) | 100 | 100 | 100 | 100 | — | 90 |  |
|  | Relaxation rate (° C.) | 20 | 20 | 20 | 30 | 0 | 20 |  |
| Transverse stretching | Stretching temperature (° C.) | 105 | 105 | 110 | 95 | 110 | 95 |  |
|  | Stretch ratio | 4.0 | 4.0 | 4.0 | 4.0 | 3.8 | 4.0 |  |
| Final heat treatment | Temperature (° C.) | 190 | 200 | 180 | 100 | 230 | 115 |  |
|  | Relaxation rate in the width direction (%) | 3 | 3 | 3 | 3 | 2 | 3 |  |
|  | Cooling temperature (° C.) | 30 | 30 | 30 | 30 | 30 | 30 |  |
|  | Film temperature at exit (° C.) | 45 | 40 | 45 | 30 | 60 | 60 |  |
|  | Film thickness (μm) | 30 | 30 | 30 | 20 | 12 | 30 | 20 |

EXAMPLE 1

On the heat resistant layer side of Film 1, an aluminum oxide ($Al_2O_3$) thin film was formed by a vacuum deposition method using aluminum as vapor deposition source with a vacuum deposition apparatus while oxygen gas was introduced to afford a laminate body. The thickness of the $Al_2O_3$ layer was 10 nm.

The characteristics of the resulting laminate bodies were evaluated by the above-described methods. The layer structures and the evaluation results are shown in Table 3.

EXAMPLES 2 TO 4, AND COMPARATIVE EXAMPLES 1 TO 5

Laminate bodies were produced in the same manner as Example 1, except that different films and different metal species in the inorganic thin film layer were used. The characteristics of the resulting laminate bodies were evaluated by the above-described methods. The layer structures and the evaluation results are shown in Table 3.

70 degrees, and was inferior in non-adsorptivity because an olefinic material was used in the heat-sealing layer.

INDUSTRIAL APPLICABILITY

The present invention relates to a laminate body that has a low capability of adsorbing components of the contents, and is excellent in heat-sealing strength and gas barrier property. In the laminate body, no opening is created by heat sealing, and the laminate body is excellent in foldability. Thus, the laminate body can be suitably used as a packaging material. In addition, the laminate body of the present, invention can be used as at least one layer to form a laminate

TABLE 3

| | | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|---|
| Layer Structure | Heat-sealing layer | Film 1 | Film 2 | Film 3 | Film 4 | Film 1 | Film 4 | Film 5 | Film 6 | Film 7 |
| | Heat resistant layer | | | | Film 5 | — | — | | | Film 5 |
| | Inorganic thin film layer | AlOx | AlOx/SiOx | Al | AlOx | — | AlOx/SiOx | AlOx | AlOx/SiOx | AlOx |
| Thickness of inorganic thin film layer (nm) | | 10 | 15 | 30 | 15 | — | 15 | 15 | 30 | 15 |
| Thickness of laminate body (μm) | | 30 | 30 | 30 | 32 | 30 | 20 | 12 | 30 | 32 |
| Heat-sealing strength at 140° C. (N/15 mm) | | 14.7 | 13.8 | 9.1 | 29.6 | 14.3 | 8.3 | 0 | 14.3 | 32.5 |
| Water vapor permeation rate (g/m$^2$ · d) | | 1.3 | 1.2 | 0.8 | 1.1 | 52 | 1.5 | 1.0 | 1.4 | 1.3 |
| Oxygen permeation rate (ml/m$^2$ · d · MPa) | | 14 | 12 | 11 | 13 | 113 | 18 | 11 | 11 | 13 |
| Hot-water heat shrinkage rate at 98° C. (%) | Lengthwise direction | 1.8 | 0.8 | 1.5 | 0.7 | 1.5 | 53 | 0.1 | 18 | 0.1 |
| | Transverse direction | 1.7 | 1.2 | 1.3 | 0.2 | 1.2 | 71 | 0.1 | 29 | 0.1 |
| | Evaluation | ○ | ○ | ○ | ○ | ○ | x | ○ | x | ○ |
| Fold holding angle (degree) | | 64 | 60 | 47 | 54 | 55 | 28 | 133 | 58 | 154 |
| Heat resistance evaluation | | ○ | ○ | ○ | ○ | ○ | x | ○ | x | ○ |
| Adsorptivity | Limonene | ○ | ○ | ○ | ○ | ○ | ○ | ○ | ○ | x |
| | Menthol | ○ | ○ | ○ | ○ | ○ | ○ | ○ | ○ | x |

[Evaluation Results of Films]

As shown in Table 3, all of the laminate bodies of Examples 1 to 4 were excellent in heat-sealing strength, water vapor permeation rate, oxygen permeation rate, heat shrinkage rate, fold holding angle, heat resistance, and non-adsorptivity, and good evaluation results were obtained.

On the other hand, the laminate body of Comparative Example 1 was excellent in heat-sealing strength, heat shrinkage rate, heat resistance, and adsorptivity. However, the laminate body had a low gas barrier property because there was no metallic thin film layer.

The sealant of Comparative Example 2 was excellent in heat-sealing strength, water vapor permeation rate, oxygen permeation rate, fold holding angle, and non-adsorptivity. However, the sealant had a large heat shrinkage rate, and the heat resistance was evaluated to be poor as denoted by a symbol x.

The sealant of Comparative Example 3 was excellent in water vapor permeation rate, oxygen permeation rate, heat shrinkage rate, heat resistance, and non-adsorptivity. However, the sealant was inferior in heat-sealing strength and fold holding angle.

The sealant of Comparative Example 4 was excellent in heat-sealing strength, water vapor permeation rate, oxygen permeation rate, fold holding angle, and non-adsorptivity. However, the sealant had a large heat shrinkage rate, and the heat resistance was evaluated to be poor as denoted by a symbol x.

The sealant of Comparative Example 5 was excellent in heat-sealing strength, water vapor permeation rate, oxygen permeation rate, heat shrinkage rate, and heat resistance. However, the sealant had a fold holding angle of higher than body together with other films, and the resulting laminate body can be used to provide a packaging bag.

The invention claimed is:

1. A laminate body having at least three different layers, wherein the at least three different layers comprise a heat resistant layer, a heat-sealing layer, and an inorganic thin film layer, the laminate body has a thickness of 3 μm to 200 μm;

the heat-sealing layer is at least one of the outermost layers of the laminate body, the heat-sealing layer includes a polyester component containing ethylene terephthalate as a main constituent, and first additional monomers other than terephthalic acid and ethylene glycol, which constitute the ethylene terephthalate, in an amount of 32 mol % to 50 mol %, wherein the first additional monomers are selected from (i) isophthalic acid and/or (ii) at least one of neopentyl glycol, 1,4-cyclohexanedimethanol, 1,4-butanediol, and diethylene glycol, the heat-sealing layer constitutes 20% to 80% of the total thickness of the laminate body, the heat resistant layer includes a polyester component containing ethylene terephthalate as a main constituent and second additional monomers other than terephthalic acid and ethylene glycol, which constitute the ethylene terephthalate, in an amount of 9 mol % to 20 mol %, wherein the second additional monomers are selected from (i) a dicarboxylic acid monomer and/or (ii) a diol monomer, the heat resistant layer contains the largest amount of ethylene terephthalate of the at least three different layers, the heat resistant layer constitutes 20% to 80% of the total thickness of the laminate body, the inorganic thin film layer comprises an inorganic acid selected from silicon oxide, aluminum oxide, and aluminum as a main component, the inorganic thin film layer has a thickness of 2 nm to 100 nm, when sealing is performed by bonding the heat-sealing layer together at 140° C. and 0.2 MPa for 2 seconds, the laminate body provides a sealing strength of 8 N/15 mm or more and 30 N/15 mm or less, the laminate body has a water vapor permeation rate of 0.1 $g/m^2 \cdot d$ or more and 6 $g/m^2 \cdot d$ or less under an atmosphere at a temperature of 40° C. and a relative humidity of 90% RH, the laminate body has an oxygen permeation rate of 5 $ml/m^2 \cdot d \cdot MPa$ or more and 30 $ml/m^2 \cdot d \cdot MPa$ or less under an atmosphere at a temperature of 23° C. and a relative humidity of 65% RH, and the laminate body has a heat shrinkage rate, after immersion in hot water at 98° C. for 3 minutes, of −5% or more and 5% or less in each of the longitudinal direction and the width direction.

2. The laminate body according to claim 1, wherein the laminate body has a fold holding angle of 20 degrees or more and 70 degrees or less.

3. A packaging bag comprising the laminate body according to claim 2 as at least one layer.

4. The laminate body according to claim 2, wherein an overcoat layer is laminated to the inorganic thin film layer.

5. A packing bag comprising the laminate body according to claim 4 as at least one layer.

6. A packaging bag comprising the laminate body according to claim 1 as at least one layer.

7. The laminate body according to claim 1, wherein an overcoat layer is laminated to the inorganic thin film layer.

8. A packing bag comprising the laminate body according to claim 7 as at least one layer.

9. The laminate body according to claim 1, wherein a difference in content of the first additional monomers of the heat-sealing layer and the second additional monomers of the heat resistant layer is 20 mol % to 35 mol %.

10. A packing bag comprising the laminate body according to claim 9 as at least one layer.

11. The laminate body according to claim 9, wherein an overcoat layer is laminated to the inorganic thin film layer.

12. A packing bag comprising the laminate body according to claim 11 as at least one layer.

13. The laminate body according to claim 1, wherein the inorganic thin film layer has an aluminum oxide content of 20% by mass to 80% by mass.

14. A packing bag comprising the laminate body according to claim 13 as at least one layer.

15. The laminate body according to claim 13, wherein an overcoat layer is laminated to the inorganic thin film layer.

16. A packing bag comprising the laminate body according to claim 15 as at least one layer.

* * * * *